(12) United States Patent
Xiao et al.

(10) Patent No.: US 10,695,749 B2
(45) Date of Patent: Jun. 30, 2020

(54) SINTER-RESISTANT CATALYST SYSTEMS

(71) Applicant: GM GLOBAL TECHNOLOGY OPERATIONS LLC, Detroit, MI (US)

(72) Inventors: Xingcheng Xiao, Troy, MI (US); Ming Yang, Warren, MI (US); Gongshin Qi, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 16/056,973

(22) Filed: Aug. 7, 2018

(65) Prior Publication Data
US 2020/0047159 A1    Feb. 13, 2020

(51) Int. Cl.
*B01J 23/02* (2006.01)
*B01J 23/10* (2006.01)
(Continued)

(52) U.S. Cl.
CPC .............. *B01J 23/44* (2013.01); *B01D 53/94* (2013.01); *B01J 23/10* (2013.01); *B01J 33/00* (2013.01);
(Continued)

(58) Field of Classification Search
CPC ... B01J 33/00; B01J 23/02; B01J 23/10; B01J 23/38; B01J 23/40; B01J 23/42; B01J 23/44; B01J 23/46; B01J 23/48; B01J 23/58; B01J 23/63; B01J 23/66; B01J 23/76; B01J 23/78; B01J 23/83; B01J 23/894; B01J 23/8946; B01J 35/0006; B01J 35/02; B01J 35/04; B01J 21/04; B01J 21/06; B01J 21/063; B01J 21/066;
(Continued)

(56) References Cited

U.S. PATENT DOCUMENTS 7,749,472 B2 * 7/2010 Chen .................... B01D 53/945
                                               423/213.2
9,649,627 B1    5/2017 Xiao et al.
(Continued)

OTHER PUBLICATIONS

U.S. Appl. No. 15/418,214, GM Global Technology Operations LLC.

*Primary Examiner* — Cam N. Nguyen

(57) ABSTRACT

Sinter-resistant catalyst systems include a catalytic substrate comprising a plurality of metal catalytic nanoparticles bound to a metal oxide catalyst support, and a coating of oxide nanoparticles disposed on the metal catalytic nanoparticles and optionally on the metal oxide support. The oxide nanoparticles comprise one or more lanthanum oxides and optionally one or more barium oxides, and additionally one or more oxides of aluminum, cerium, zirconium, titanium, silicon, magnesium, zinc, iron, strontium, and calcium. The metal catalytic nanoparticles can include ruthenium, rhodium, palladium, osmium, iridium, and platinum, rhenium, copper, silver, and/or gold. The metal oxide catalyst support can include one or more metal oxides selected from the group consisting of $Al_2O_3$, $CeO_2$, $ZrO_2$, $TiO_2$, $SiO_2$, $La_2O_3$, MgO, and ZnO. The coating of oxide nanoparticles is about 0.1% to about 50% lanthanum and barium oxides. The oxide nanoparticles can further include one or more oxides of magnesium and/or cobalt.

20 Claims, 1 Drawing Sheet

Figure 1:
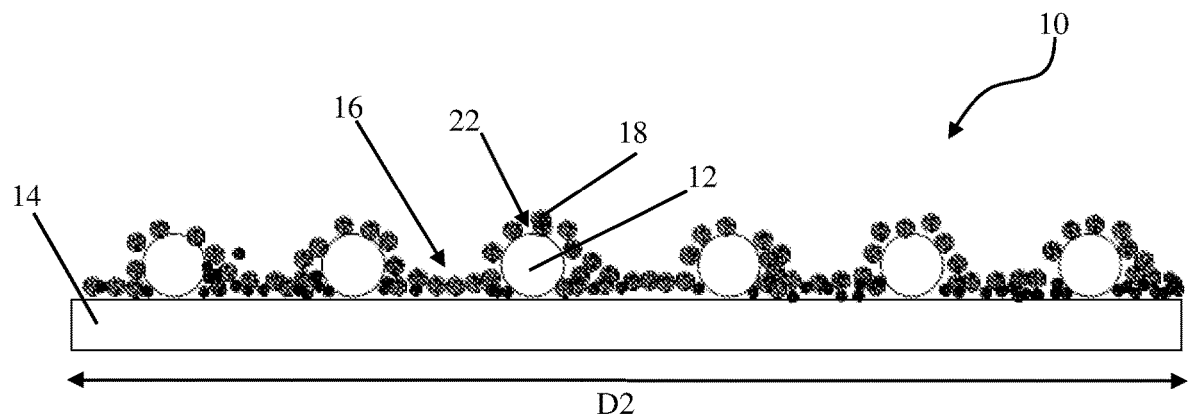

(51) Int. Cl.

| | |
|---|---|
| *B01J 23/38* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/48* | (2006.01) |
| *B01J 23/58* | (2006.01) |
| *B01J 23/63* | (2006.01) |
| *B01J 23/66* | (2006.01) |
| *B01J 23/76* | (2006.01) |
| *B01J 23/78* | (2006.01) |
| *B01J 23/83* | (2006.01) |
| *B01J 23/89* | (2006.01) |
| *B01J 33/00* | (2006.01) |
| *B01J 35/00* | (2006.01) |
| *B01J 35/02* | (2006.01) |
| *B01J 35/04* | (2006.01) |
| *B01J 21/04* | (2006.01) |
| *B01J 21/06* | (2006.01) |
| *B01J 21/08* | (2006.01) |
| *B01J 21/10* | (2006.01) |
| *B01J 21/12* | (2006.01) |
| *B01J 21/14* | (2006.01) |
| *B01D 53/94* | (2006.01) |

(52) U.S. Cl.
CPC ... *B01J 35/0013* (2013.01); *B01D 2255/1023* (2013.01)

(58) Field of Classification Search
CPC ... B01J 21/08; B01J 21/10; B01J 21/12; B01J 21/14
See application file for complete search history.

(56) References Cited

U.S. PATENT DOCUMENTS

| | | | |
|---|---|---|---|
| 9,687,811 B2* | 6/2017 | Biberger | B01J 20/02 |
| 9,827,562 B2 | 11/2017 | Qi et al. | |
| 9,901,907 B1 | 2/2018 | Xiao et al. | |
| 10,035,133 B2 | 7/2018 | Yang et al. | |
| 10,124,322 B2* | 11/2018 | Biberger | B01J 23/63 |
| 10,413,880 B2* | 9/2019 | Biberger | B01J 20/02 |
| 2015/0140317 A1* | 5/2015 | Biberger | B01J 21/04 |
| | | | 428/317.9 |
| 2017/0114458 A1 | 4/2017 | Xiao et al. | |
| 2018/0185831 A1 | 7/2018 | Yang et al. | |
| 2018/0185832 A1 | 7/2018 | Xiao et al. | |
| 2018/0207620 A1* | 7/2018 | Biberger | B01J 23/63 |
| 2018/0318763 A1* | 11/2018 | Biberger | B01J 20/18 |
| 2019/0160427 A1* | 5/2019 | Deeba | B01J 21/066 |
| 2019/0240643 A1* | 8/2019 | Karpov | B01J 23/464 |

* cited by examiner

SINTER-RESISTANT CATALYST SYSTEMS

BACKGROUND

Catalytic nanoparticles can make up the active sites of catalysts used in a variety of applications, such as for the production of fuels, chemicals and pharmaceuticals, and for emissions control from automobiles, factories, and power plants. Because catalytic nanoparticles tend to agglomerate, this decreases their surface area and active site accessibility, so they are often coupled to support materials. The supports physically separate the catalytic nanoparticles to prevent agglomeration, and to increase their surface area and active site accessibility. Thus, catalyst systems typically include one or more compounds; a porous catalyst support material; and one or more optional activators.

After continued use, especially at elevated temperatures, catalyst systems comprising supported catalytic nanoparticles lose catalytic activity due to sintering, e.g., thermal deactivation that occurs at high temperatures. Through various mechanisms, sintering results in changes in metal particle size distribution over a support and an increase in mean particle size; hence, a decrease in surface area for the active catalyst compounds. For example, particle migration and coalescence is a form of sintering where particles of catalytic nanoparticles move or diffuse across a support surface, or through a vapor phase, and coalesce with another nanoparticle, leading to nanoparticle growth. Ostwald ripening is another form of sintering wherein migration of mobile species are driven by differences in free energy and local atom concentrations on a support surface. After sintering processes occur, catalyst activity can decrease. Therefore, catalyst systems are often loaded with a sufficient amount of supported catalytic nanoparticles to account for a loss of catalytic activity over time and to continue to have the ability to meet, for example, emissions standards over a long period of operation at high temperature.

SUMMARY

Sinter-resistant catalyst systems are provided, and include a catalytic substrate having a plurality of metal catalytic nanoparticles bound to a metal oxide catalyst support, and a coating of oxide nanoparticles disposed on the metal catalytic nanoparticles and optionally on the metal oxide support. The oxide nanoparticles can include one or more lanthanum oxides, and additionally one or more oxides of aluminum, cerium, zirconium, titanium, silicon, magnesium, zinc, iron, strontium, and calcium. The metal catalytic nanoparticles can include one or more of ruthenium, rhodium, palladium, osmium, iridium, and platinum, rhenium, copper, silver, and gold. The metal oxide catalyst support can include one or more of $Al_2O_3$, $CeO_2$, $La_2O_3$, $ZrO_2$, $TiO_2$, $SiO_2$, MgO, and ZnO. The metal oxide catalyst support can include one or more of $Al_2O_3$, $La_2O_3$, $ZrO_2$, and $CeO_2$. The coating of oxide nanoparticles can be about 0.1% to about 50% lanthanum oxides. The oxide nanoparticles can further include one or more oxides of magnesium and/or cobalt. The coating of oxide nanoparticles can be about 0.1% to about 50% lanthanum, and magnesium and/or cobalt oxides. The average diameter of the plurality of metal catalytic nanoparticles can be about 1 nm to about 20 nm.

Other sinter-resistant catalyst systems are also provided, and include a catalytic substrate comprising a plurality of metal catalytic nanoparticles bound to a metal oxide catalyst support, and a coating of oxide nanoparticles disposed on the metal catalytic nanoparticles and optionally on the metal oxide support. The oxide nanoparticles can include one or more lanthanum oxides and one or more barium oxides, and additionally one or more oxides of aluminum, cerium, zirconium, titanium, silicon, magnesium, zinc, iron, strontium, and calcium. The metal catalytic nanoparticles can include one or more of ruthenium, rhodium, palladium, osmium, iridium, and platinum, rhenium, copper, silver, and gold. The metal oxide catalyst support can include one or more metal oxides selected from the group consisting of $Al_2O_3$, $CeO_2$, $ZrO_2$, $TiO_2$, $SiO_2$, $La_2O_3$, MgO, and ZnO. The metal oxide catalyst support can include one or more of $Al_2O_3$, $La_2O_3$, $ZrO_2$, and $CeO_2$. The metal oxide catalyst support can be $Al_2O_3$. The coating of oxide nanoparticles can be about 0.1% to about 50% lanthanum and barium oxides. The oxide nanoparticles can further include one or more oxides of magnesium and/or cobalt. The coating of oxide nanoparticles can be about 0.1% to about 50% lanthanum, barium, and magnesium and/or cobalt oxides. The catalyst system can have a catalytic loading of about 0.25% to about 6%. The average diameter of the plurality of metal catalytic nanoparticles can be about 1 nm to about 20 nm.

Other objects, advantages and novel features of the exemplary embodiments will become more apparent from the following detailed description of exemplary embodiments and the accompanying drawings.

DRAWINGS

The drawings described herein are for illustrative purposes only of selected embodiments and not all possible implementations, and are not intended to limit the scope of the present disclosure.

Figure 2:
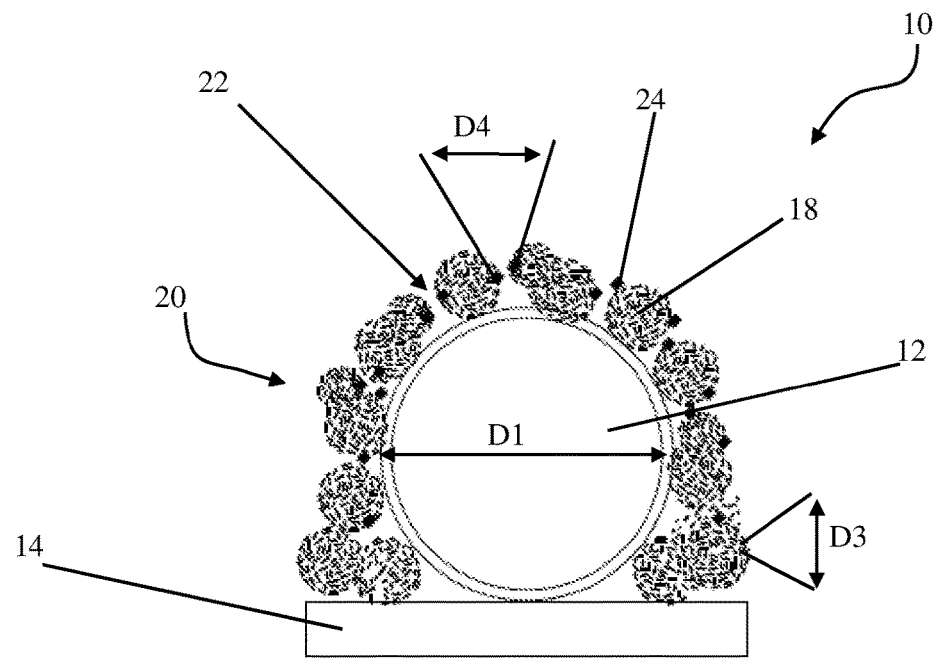

FIG. 1 illustrates a schematic side-view of a sinter-resistant catalyst system, according to one or more embodiments; and FIG. 2 illustrates an exploded view of a portion of the catalyst system of FIG. 1, according to one or more embodiments.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present technology provides sinter-resistant catalyst systems with reduced catalytic loading relative to catalyst systems of comparable catalytic performance. In particular, the catalyst systems exhibit reduced vapor-phase and surface migration of catalytic nanoparticles. With reference to FIG. 1, the current technology also provides a catalyst system 10 that resists sintering and retains catalytic activity after prolonged exposures to elevated temperatures. The catalyst includes catalytic nanoparticles 12 bound to a catalyst support 14 and a coating 16 of oxide coating nanoparticles 18 disposed on the catalytic nanoparticles 12 and optionally on the catalyst support 14. The coating 16 comprises lanthanum, or lanthanum and barium oxide coating nanoparticles 18, in addition to one or more other oxide coating nanoparticles 18 as will be described below. The catalytic nanoparticles 12 have a catalytic loading on the catalyst support (i.e., the weight percent of the catalytic nanoparticles 12 relative to the entire catalytic system 10) of about 0.1% to about 10%, about 0.25% to about 6%, or about 1% to about 4%. Unless otherwise specified, all percentages expressed herein refer to percentages by weight. In some embodiments, the catalytic loading of the catalytic nanoparticles 12 on the catalyst support 14 is about 1.5%. An exploded view of the catalyst system 10 showing a catalytic nanoparticle 12 bound to a catalyst support 14 (i.e., a catalytic substrate 20) is shown in FIG. 2.

It should be noted the catalyst support 14 may have shapes or forms other than a planar structure as shown in FIG. 1, for example, it may have conventional monolith or honeycomb shapes or the catalyst support 14 may be in the form of beads for a packed bed catalyst, as known in the art. The coating 16 of oxide coating nanoparticles 18 can cover at least about 5% of the surface area of the catalytic nanoparticles 12, and up to about 100% of the surface area of the catalytic nanoparticles 12. The catalyst system 10 comprises a plurality of pores 22, such that reacting gas molecules can access the catalytic nanoparticles 12 having catalytic activity, yet metal particles or vapors 24 are prevented from coalescing with the catalytic nanoparticles 12. In some embodiments, the pores 22 can have an average diameter D4 of about 0.5 nm to about 30 nm. Therefore, the coating 16 renders the catalyst system 10 resistant to sintering or thermal degradation by increasing the surface area of the catalyst system 10 and trapping or depositing the particles or vapors 24 generated from particle migration and coalescence or Ostwald ripening resulting from the catalyst system 10 being continuously subjected to elevated temperatures. Moreover, particles 24 trapped or deposited in the pores 22 or the coating 16 retain catalytic activity, which can be expressed as catalytic metal dispersion.

"Catalyst metal dispersion" refers to a ratio of the mass of exposed catalytic nanoparticle 12 atoms relative to the total to a mass of all catalytic nanoparticles 12 in a catalyst system 10. Therefore, a catalyst system with a high dispersion will have smaller and more highly dispersed metal catalysts relative to a catalyst system with a low dispersion. Relative to a catalyst system equivalent to the catalyst system 10 described herein, but without a porous coating, a catalyst system having an increased resistance to sintering has a dispersion loss of less than about 74% after exposure to a temperature of about 650° C. for a time period of about 2 hours. A catalyst system that that resists sintering is a catalyst system that undergoes a dispersion loss of less than or equal to about 20%, less than or equal to about 15%, or less than or equal to about 10% after exposure to a temperature of about 650° C. for a time period of about 2 hours.

The catalyst support 14 can comprise a thermally stable, porous material, such as a metal oxide. In some embodiments, the catalyst support 14 can comprise one or more oxides of aluminum (Al), cerium (Ce), zirconium (Zr), titanium (Ti), silicon (Si), magnesium (Mg), zinc (Zn), lanthanum (La), barium (Ba), iron (Fe), strontium (Sr), and calcium (Ca). In some embodiments, the catalyst support 14 can comprise one or more of $Al_2O_3$, $CeO_2$, $ZrO_2$, $TiO_2$, $SiO_2$, MgO, ZnO, $La_2O_3$, BaO, $Fe_2O_3$, $Fe_3O_4$, SrO, and CaO. In some embodiments, the catalyst support 14 can comprise one or more metal oxides selected from the group consisting of $Al_2O_3$, $CeO_2$, $ZrO_2$, $TiO_2$, $SiO_2$, MgO, ZnO, $La_2O_3$, BaO, $Fe_2O_3$, $Fe_3O_4$, SrO, and CaO. In some embodiments, the catalyst support can comprise one or more metal oxides selected from the group consisting of $Al_2O_3$, $CeO_2$, $ZrO_2$, $TiO_2$, $SiO_2$, $La_2O_3$, MgO, and ZnO. In some embodiments, the catalyst support 14 can comprise one or more of $CeO_2$, $ZrO_2$, and $Al_2O_3$. In some embodiments, the catalyst support 14 can comprise one or more metal oxides selected from the group consisting of $CeO_2$, $ZrO_2$, $La_2O_3$, and $Al_2O_3$. The catalyst support 14 can have a surface area of about 50 $m^2/g$ to about 200 $m^2/g$, or about 5 $m^2/g$ to about 2,000 $m^2/g$, in some embodiments. The catalyst support 14 can have a diameter of about 10 nm to about 50,000 nm, although other sizes are practicable. In general, the catalyst support 14 will have a diameter which is at least equal to the diameter of the catalytic nanoparticles 12. In one embodiment, the catalyst support 14 has a diameter of about 15 nm to about 25 nm, and the catalytic nanoparticle has a diameter to about 0.5 nm to about 1 nm.

The catalytic nanoparticle 12 can comprise a platinum group metal (PGM) nanoparticle, such as one or more nanoparticles of ruthenium (Ru), rhodium (Rh), palladium (Pd), osmium (Os), iridium (Ir), and platinum (Pt), and other metals such as one or more nanoparticles of rhenium (Re), copper (Cu), silver (Ag), and gold (Au). In general, a smaller catalytic nanoparticle 12 size is desired in order to increase the surface area per weight or volume of the catalytic metal bound to the support. In some embodiments, the catalytic nanoparticles 12, as applied to the catalyst support 14, can have an average diameter of about 0.5 nm to about 50 nm, about 1 nm to about 10 nm, or about 4 nm to about 6 nm, or up to about 12 nm, or up to about 50 nm. It is understood that aggregation of the catalytic nanoparticles 12 may occur during use of the catalyst system 10. Accordingly, in some embodiments, the catalytic nanoparticles 12 of catalyst system 10 can have an average diameter of about 0.5 nm to about 50 nm, about 1 nm to about 20 nm, or about 4 nm to about 10 nm. The plurality of catalytic nanoparticles 12 can be bound to the catalyst support 14 by conventional methods known in the art, such as by wetness impregnation, ion adsorption, or ion exchange, among others. For example, co-owned U.S. patent application Ser. No. 15/334,109 describes some practicable methods for binding catalytic nanoparticles 12 to the catalyst support 14. The catalytic nanoparticles 12 can be the same catalytic metal, or a plurality of catalytic metals as described above.

The coating 16 of oxide coating nanoparticles 18 is disposed on the catalytic substrate 20. In some embodiments, the coating 16 is disposed on the metal catalytic nanoparticles 12 and optionally on the metal oxide support 14. The oxide coating nanoparticles 18 can comprise any materials suitable for the catalyst support 14, as described above, including one or more oxides of aluminum (Al), cerium (Ce), zirconium (Zr), titanium (Ti), silicon (Si), magnesium (Mg), zinc (Zn), barium (Ba), lanthanum (La), iron (Fe), strontium (Sr), cobalt (Co) and calcium (Ca). Non-limiting examples of such metal oxides include $Al_2O_3$, $CeO_2$, $ZrO_2$, $TiO_2$, $SiO_2$, MgO, ZnO, BaO, $La_2O_3$, $Fe_2O_3$, $Fe_3O_4$, SrO, CoO, $Co_2O_3$, $Co_3O_4$, and CaO. The average diameter of the oxide coating nanoparticles 18 can be less than the average diameter of the catalytic nanoparticles 12. The oxide coating nanoparticles 18 have an average diameter of about 0.2 nm to about 50 nm, in some embodiments.

In some embodiments, the oxide coating nanoparticles 18 can have an average diameter less than the average diameter of the catalytic nanoparticles 12. In some embodiments, the oxide coating nanoparticles 18 can comprise about 5% to about 50% of the combined weight of the oxide coating nanoparticles 18 and the catalytic nanoparticles 12 of the catalytic system 10.

In some embodiments, the coating 16 comprises one or more lanthanum oxides, and additionally one or more oxides of aluminum (Al), cerium (Ce), zirconium (Zr), titanium (Ti), silicon (Si), zinc (Zn), iron (Fe), strontium (Sr), and calcium (Ca). In some embodiments, the coating 16 can comprise about 0.1% to about 50% lanthanum oxides, about 2.5% to about 20% lanthanum oxides, or about 5% to about 15% lanthanum oxides. The coating 16 can optionally further include oxides of magnesium (Mg) and/or cobalt (Co). In some embodiments, the coating 16 can comprise about 0.1% to about 50%, about 2.5% to about 20%, or about 5% to about 15% lanthanum oxides, and magnesium oxides and/or cobalt oxides, collectively.

In some embodiments, the coating 16 comprises one or more lanthanum oxides and one or more barium oxides, and additionally one or more oxides of aluminum (Al), cerium (Ce), zirconium (Zr), titanium (Ti), silicon (Si), zinc (Zn), iron (Fe), strontium (Sr), and calcium (Ca). In some embodiments, the coating 16 can be about 0.1% to about 50% lanthanum and barium oxides, about 2.5% to about 20% lanthanum and barium oxides, or about 5% to about 15% lanthanum and barium oxides. The coating 16 can optionally further include oxides of magnesium (Mg) and/or cobalt (Co). In some embodiments, the coating 16 can comprise about 0.1% to about 50%, about 2.5% to about 20%, or about 5% to about 15% lanthanum oxides, barium oxides, and magnesium oxides and/or cobalt oxides, collectively.

In some embodiments, the coating 16 can be formed by physically combining the catalytic substrate 20 with the oxide coating nanoparticles 18 using one or more "dry" approaches. For example, physically combining the catalytic substrate 20 with the oxide coating nanoparticles 18 can comprise physical mixing and/or electrostatic combination without the use of solvents. Physical mixing can include ball milling, blending (e.g., using a mortar and pestil), acoustic mixing, or theta composition. Theta composition utilizes a theta composer which generally includes a rotating vessel with an internal rotor which is rotating in a non-similar direction (e.g., opposite) relative to the vessel. The internal rotor may also rotate at a different speed (e.g., faster) than the vessel. In general, the duration and intensity of physical mixing can be selected to achieve a desired coating thickness and/or uniformity of oxide coating nanoparticles 18 applied to the catalytic nanoparticles 12 and/or the catalyst support 14. Electrostatic combination can include electrostatic spraying, which comprises applying a charge to one or more of the catalytic substrate 20 and oxide coating nanoparticles 18 prior to combination.

In some embodiments, the coating 16 can be formed by wet-chemistry or solution-based approaches. Some such approaches are disclosed in co-owned U.S. patent application Ser. No. 15/010,937, the disclosure of which is herein incorporated in its entirety. For example, the coating 16 can be applied by generally contacting the catalytic substrate 20 with a solution comprising metal salts dissolved in a solvent. The metal salts present in the solution are selected to reflect the metal oxide composition of the coating 16. For example, a coating 16 comprising lanthanum, barium, and aluminum oxides can be applied via a solution comprising lanthanum salts, barium salts, and aluminum salts.

As non-limiting examples, salts of Al include $AlCl_3$, $Al(NO_3)_3$, $Al(OH)_3$, $Al_2(SO_4)_3$, $Al(ClO_3)_3$, $AlO_4P$, and $Al(PO_3)_3$; salts of Ce include $Ce(NO_3)_3$, $Ce(OH_4)$, $Ce_2(SO_4)_3$, and $Ce(SO_4)_2$; salts of Zr include $Zr(HPO_4)_2$, $Zr(OH)_4$, and $Zr(SO_4)_2$; salts of Ti include $TiOSO_4$ and $TiOPO_4$; salts of Si include $SiPO_4(OH)$; salts of Mg include $MgSO_4$, $Mg(NO_3)_2$, $MgHPO_4$, and $Mg_3(PO_4)_2$; salts of Zn include $Zn(NO_3)_2$, $Zn_3(PO_4)_2$, and $ZnSO_4$; salts of Ba include $BaCO_3$, $BaCl_2$, and $BaCrO_4$; salts of K include $KHSO_4$, $KCl$, $K_2CO_3$, $K_2CrO_4$, $K_2Cr_2O_7$, $KOH$, $KIO_3$, $KI$, $K_2MnO_4$, $KVO_3$, $K_2MoO_4$, $KNO_3$, $KClO_4$, $K_2S_2O_8$, $K_2HPO_4$, $K_4P_2O_7$, and $K_2SO_4$; salts of Na include $NaBr$, $NaCl$, $Na_2CO_3$, $Na_2CrO_4$, $HCOONa$, $NaHSO_4$, $NaOH$, $NaBO_2$, $Na_2O_3Si$, $NaVO_3$, $Na_2MoO_4$, $NaNO_3$, $NaOOC$-$COONa$, $NaMnO_4$, $Na_3PO_4$, $Na_2HPO_4$, $Na_2H_2P_2O_7$, $Na_4P_2O_7$, $Na_2SO_4$, and $Na_3P_3O_9$; salts of Ca include $CaCl_2$, $CaCO_3$, $CaFPO_3$, $Ca(OH)_2$, $Ca(IO_3)_2$, $Ca(NO_3)_2$, $Ca(NO_2)_2$, $CaC_2O_4$, $Ca(H_2PO_4)_2$, $Ca_2P_2O_7$, $CaSO_4$, $LaCl3$, $La(NO3)3$, $LaPO4$, $La2(CO3)3$, $La(OH)3$, and $La2(SO4)3$; $Fe(NO_3)_3$, $FePO_4$, and $Fe2(SO4)$; $Sr3(PO4)2$, $Sr(HCO3)2$, $Sr(NO2)2$, $SrSO4$, $Sr(BrO4)2$ and $SrCl2$, $CoCO3$, $Co(NO_3)_3$, $CoSO_4$, and $CoCl_1$; and any combinations thereof. The solvent is non-limiting, and can be water, an alcohol, or other organic solute.

Example 1

The light-off temperatures for carbon monoxide (CO) and propene ($C_3H_6$) were tested for three catalyst systems. The light-off temperature for a catalyst is defined as the temperature at which the catalyst converts a chemical species (e.g., CO, $C_3H_6$) to a desired product. A lower light off temperature is desired in many catalytic applications, particularly in automotive and vehicular applications. In the present examples, the CO light-off temperature represents the temperature at which 50% of the CO species in a sample are converted to $CO_2$, and the $C_3H_6$ light-off temperature represents the temperature at which 50% of the $C_3H_6$ species in a sample are combusted.

The first catalyst system included alumina catalyst supports modified by about 4% to about 5% lanthanum, and comprising an average diameter of about 20 nm, an average pore size of about 10 nm, and a BET surface area: 190±7 $m^2/g_{cat}$. The catalyst supports were loaded with Pd nanoparticles with average diameters of about 2 nm to about 5 nm such that the Pd nanoparticles accounted for 1.4% of the combined weight of the catalyst support and the Pd nanoparticles.

The second catalyst system included alumina catalyst supports modified by about 4% to about 5% lanthanum, and comprising an average diameter of about 20 nm, an average pore size of about 10 nm, and a BET surface area: 190±7 $m^2/g_{cat}$. The catalyst supports were loaded with Pd nanoparticles with average diameters of about 2 nm to about 5 nm such that the Pd nanoparticles accounted for 1.4% of the combined weight of the catalyst support and the Pd nanoparticles. The support and Pd catalytic nanoparticles were coated with $Al2O3$ nanoparticles with an average diameter of about 5 nm to about 50 nm. The average coating thickness deposited on each of the catalytic substrates was about 100 nm, with a porosity of about 50%.

The third catalyst system included alumina catalyst supports modified by about 4% to about 5% lanthanum, and comprising an average diameter of about 20 nm, an average pore size of about 10 nm, and a BET surface area: 190±7 $m^2/g_{cat}$. The catalyst supports were loaded with Pd nanoparticles with average diameters of about 2 nm to about 5 nm such that the Pd nanoparticles accounted for 1.4% of the combined weight of the catalyst support and the Pd nanoparticles. The support and Pd catalytic nanoparticles were coated with Al2O3 nanoparticles with an average diameter of about 5 nm to about 50 nm. The average coating thickness deposited on each of the catalytic substrates was about 100 nm, with a porosity of about 50%.

The three catalyst systems were hydrothermally aged by starting at room temperature and ramping up to 1050° C. in about two hours, and subsequently holding the temperature at 1050° C. for 48 hours. During the heating process, a 10% $H_2O$-Air mixture (by volume) flowed through the catalysts at a rate of 100 ml/min. The aged catalysts were cooled down to room temperature by flowing the ambient-temperature air at a rate of 100 ml/min into the ageing chamber. After aging, the three catalyst systems were each contacted with a gaseous mixture comprising 5,000 ppm CO, 500 ppm $C_3H_6$, 500 ppm NO, 0.3% (by volume) O2, 5% (by volume) $H_2O$, and the balance $N_2$. The catalysts were initially contacted with the gaseous mixture at a temperature of 100° C., and the temperature was ramped at 2° C./minute to 450° C. The contact time for each catalyst system was 1,500,000 $cm^3$ $gcat^{-1}$ $h^{-1}$. Table 1 recites the CO and $C_3H_6$ light off temperatures for each catalyst system:

TABLE 1

| Catalyst System | CO Light Off (° C.) | C3H6 Light Off (° C.) |
|---|---|---|
| 1 | 306 | 335 |
| 2 | 290 | 321 |
| 3 | 282 | 314 |

The results in Table 1 indicate that catalyst systems 2 and 3 (i.e., the catalyst systems with oxide coatings applied to the catalytic substrates) exhibited lower light-off temperatures for both CO and $C_3H_6$. Catalyst system 3 (i.e., the catalyst system with lanthanum oxide nanoparticle coatings applied to the catalytic substrate) exhibited the lowest light-off temperatures for both CO and $C_3H_6$ out of all three catalyst systems. The results indicate that lanthanum oxide coatings improve the sintering resistance of catalyst supports (e.g., alumina catalyst supports). Without being held to a particular mechanism, the lanthanum oxide coatings are believed to provide an enhanced surface diffusion barrier for catalytic metal nanoparticles (e.g., Pd nanoparticles), particularly at high temperatures.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A sinter-resistant catalyst system comprising:
    a catalytic substrate comprising a plurality of metal catalytic nanoparticles bound to a metal oxide catalyst support; and
    a coating of oxide nanoparticles disposed on the metal catalytic nanoparticles and optionally on the metal oxide support,
    wherein the oxide nanoparticles comprise one or more lanthanum oxides, and additionally one or more oxides of aluminum, cerium, zirconium, titanium, silicon, magnesium, zinc, iron, strontium, and calcium, and the coating of oxide nanoparticles is about 0.1% to about 50% lanthanum oxides.

2. The catalyst system of claim 1, wherein the metal catalytic nanoparticles comprise one or more of ruthenium, rhodium, palladium, osmium, iridium, and platinum, rhenium, copper, silver, and gold.

3. The catalyst system of claim 1, wherein the metal oxide catalyst support comprises one or more of $Al_2O_3$, $CeO_2$, $ZrO_2$, $TiO_2$, $SiO_2$, $La_2O_3$, MgO, and ZnO.

4. The catalyst system of claim 1, wherein the metal oxide catalyst support comprises one or more of $Al_2O_3$, $La_2O_3$, $ZrO_2$, and $CeO_2$.

5. The catalyst system of claim 1, wherein the oxide nanoparticles further comprise one or more oxides of magnesium and/or cobalt.

6. The catalyst system of claim 5, wherein the coating of oxide nanoparticles is about 0.1% to about 50% lanthanum, and magnesium and/or cobalt oxides.

7. The catalyst system of claim 1, wherein the average diameter of the plurality of metal catalytic nanoparticles is about 1 nm to about 20 nm.

8. A sinter-resistant catalyst system comprising:
    a catalytic substrate comprising a plurality of metal catalytic nanoparticles bound to a metal oxide catalyst support; and
    a coating of oxide nanoparticles disposed on the metal catalytic nanoparticles and optionally on the metal oxide support,
    wherein the oxide nanoparticles comprise one or more lanthanum oxides and one or more barium oxides, and additionally one or more oxides of aluminum, cerium, zirconium, titanium, silicon, magnesium, zinc, iron, strontium, and calcium, and the coating of oxide nanoparticles is about 0.1% to about 50% lanthanum and barium oxides.

9. The catalyst system of claim 8, wherein the metal catalytic nanoparticles comprise one or more of ruthenium, rhodium, palladium, osmium, iridium, and platinum, rhenium, copper, silver, and gold.

10. The catalyst system of claim 8, wherein the metal oxide catalyst support comprises one or more metal oxides selected from the group consisting of $Al_2O_3$, $CeO_2$, $ZrO_2$, $TiO_2$, $SiO_2$, $La_2O_3$, MgO, and ZnO.

11. The catalyst system of claim 8, wherein the metal oxide catalyst support comprises one or more of $Al_2O_3$, $La_2O_3$, $ZrO_2$, and $CeO_2$.

12. The catalyst system of claim 8, wherein the metal oxide catalyst support comprises $Al_2O_3$.

13. The catalyst system of claim 8, wherein the oxide nanoparticles further comprise one or more oxides of magnesium and/or cobalt.

14. The catalyst system of claim 13, wherein the coating of oxide nanoparticles is about 0.1% to about 50% lanthanum, barium, and magnesium and/or cobalt oxides.

15. The catalyst system of claim 8, wherein the catalyst system has a catalytic loading of about 0.25% to about 6%.

16. The catalyst system of claim 8, wherein the average diameter of the plurality of metal catalytic nanoparticles is about 1 nm to about 20 nm.

17. A sinter-resistant catalyst system comprising:
   a catalytic substrate comprising a plurality of metal catalytic nanoparticles bound to a metal oxide catalyst support; and
   a coating of oxide nanoparticles disposed on the metal catalytic nanoparticles and optionally on the metal oxide support,
   wherein the oxide nanoparticles comprise one or more lanthanum oxides, and additionally one or more oxides of aluminum, cerium, zirconium, titanium, silicon, magnesium, zinc, iron, strontium, and calcium, and the average diameter of the plurality of metal catalytic nanoparticles is about 1 nm to about 20 nm.

18. The catalyst system of claim 17, wherein the metal catalytic nanoparticles comprise one or more of ruthenium, rhodium, palladium, osmium, iridium, and platinum, rhenium, copper, silver, and gold.

19. The catalyst system of claim 17, wherein the oxide nanoparticles further comprise one or more oxides of magnesium and/or cobalt.

20. The catalyst system of claim 19, wherein the coating of oxide nanoparticles is about 0.1% to about 50% lanthanum, and magnesium and/or cobalt oxides.

* * * * *